E. J. LUKEMEYER & W. GEIB.
SAW TOOTH SHAPER.
APPLICATION FILED JAN. 10, 1912.
1,049,884.
Patented Jan. 7, 1913.
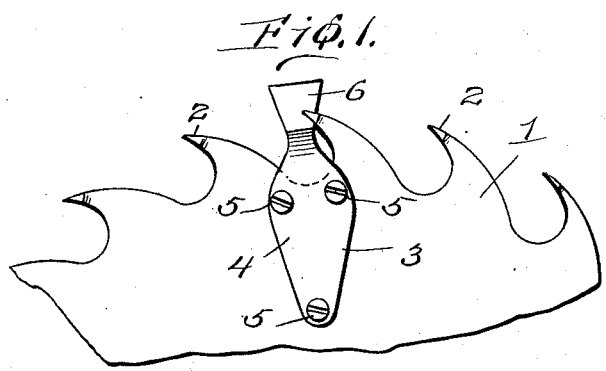
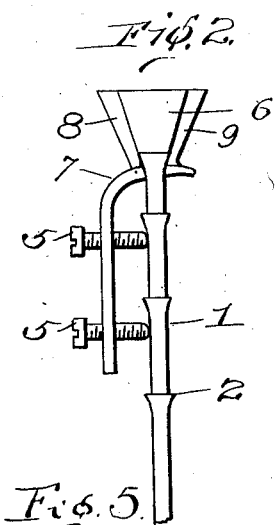
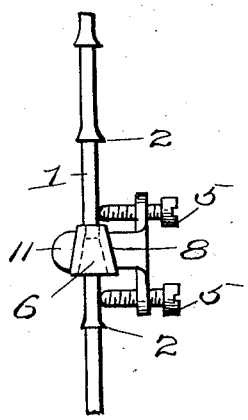
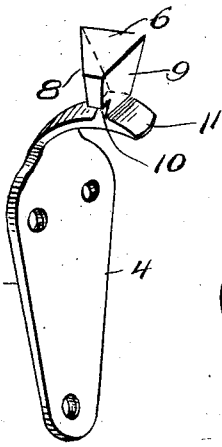
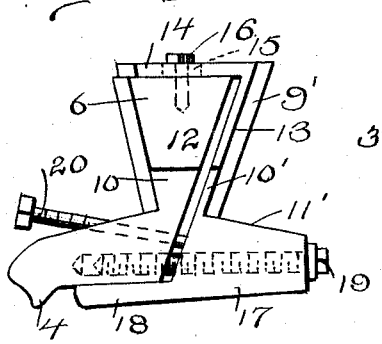
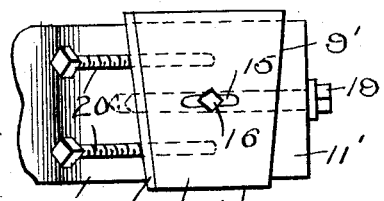

UNITED STATES PATENT OFFICE.

EDWIN J. LUKEMEYER, OF HELENA, ARKANSAS, AND WILLIAM GEIB, OF CLOVERDALE, MICHIGAN.

SAW-TOOTH SHAPER.

1,049,884.  Specification of Letters Patent.  Patented Jan. 7, 1913.

Application filed January 10, 1912. Serial No. 670,529.

*To all whom it may concern:*

Be it known that we, EDWIN J. LUKEMEYER, a citizen of the United States, and resident of Helena, in the county of Phillips and State of Arkansas, formerly of Huntingburg, in the county of Dubois and State of Indiana, and WILLIAM GEIB, a citizen of the United States, and resident of Cloverdale, in the county of Barry and State of Michigan, have invented certain new and useful Improvements in Saw-Tooth Shapers; and we do hereby declare the following to be a full, clear, and exact description of the invention, such as will enable others skilled in the art to which it appertains to make and use the same.

This invention relates to improvements in saw tooth shapers for saws, and has for an object the arrangement of improved means by which swaged teeth may be equalized and correctly shaped.

Another object of the invention is the arrangement of a shaper for swaged teeth comprising an adjustable body portion and a tooth engaging portion formed with ways for determining the angle of a file used in shaping the teeth being operated upon.

With these and other objects in view the invention comprises certain novel constructions, combinations, and arrangement of parts as will be hereinafter more fully described and claimed.

In the accompanying drawings: Figure 1 is a fragmentary side view of a saw with an embodiment of the invention applied thereto. Fig. 2 is an edge view of the structure shown in Fig. 1. Fig. 3 is a top plan view of the structure shown in Fig. 1. Fig. 4 is a perspective view of the shaper shown in Fig. 1. Fig. 5 is a fragmentary view of a slightly modified form of the invention, the same showing an adjustable head. Fig. 6 is a top plan view of the structure shown in Fig. 5.

Referring to the accompanying drawings by numerals, 1 indicates a saw formed with teeth 2 adapted to be swaged. After the teeth 2 have been properly swaged it is necessary to go over the same and sharpen the teeth and otherwise shape the same so that the teeth will be approximately the same size. Several means have been provided for accomplishing this result and several methods utilized, but according to the present invention a shaper 3 is used formed with a body portion 4 accommodating a plurality of adjusting screws 5. The adjusting screws 5 are adapted to hold the body 4 at any desired distance from the saw 1, and to properly adjust the head 6 so that the center of the same will register with the center of the saw 1. Body 4 is bent and somewhat reduced at point 7 from which it merges into head 6. Head 6 is formed substantially wedge shaped and therefore presents beveled sides 8 and 9 which act as guides for a file used in filing the sides of the teeth 2. A notch 10 is formed in head 6 for accommodating the edge or the point of the respective teeth, so that the sides thereof will flare outwardly on each side of the center line of head 6 and in a position to be engaged by the file as the same is moved back and forth across the beveled or inclined surfaces 8 and 9. Extension 11 is also provided for assisting in guiding the saw.

In operation the saw 1 is swaged in any desired manner. It will be evident that the saw 1 may be of the circular variety or an ordinary straight saw or any other kind of saw as desired. After the saw 1 has been swaged the shaper 3 is placed thereon and then the screws 5 are moved until the shaper is adjusted so that the center of the head 6 will come opposite the center of the saw. Then a file is used for shaping the sides of the teeth. After the first tooth has been properly shaped the shaper is moved to the next tooth and from thence to the next succeeding tooth. This action is continued until all of the teeth have been properly shaped.

In Figs. 5 and 6 is disclosed a slightly modified form of the invention in which the head 6 is divided into a rigid portion 12 connected preferably integrally with the body portion 4, and an adjustable portion 13 adjustably connected with the body portion 4 and the rigid portion 12. The movable or adjustable portion 13 is formed with an inclined side portion 9' and a file guiding portion 11', together with a notch 10' registering with notch 10. Adjustable or movable portion 13 is formed with an upper end 14 having a slot 15 formed therein through which passes a clamping bolt 16. The lower part of the movable portion 13 is formed with an enlargement 17 and an extension 18. The enlargement 17 is adapted to accommodate a clamping screw or bolt 19 which enters a suitable threaded aperture in the body 4 for drawing the movable portion 13 toward the rigid or stationary portion 12, the same being guided in its movement by extension 18 and upper end 14. Extension 18 also acts as a brace for stiffening the movable portion when the shaper is in use. Preferably there is only one bolt or screw 19 for drawing the movable portion toward the rigid portion, but there are preferably a plurality of bolts or screws 20 passing through the upper end of body 4 and pressing against the enlargement 17 for spreading or moving away the movable portion 13 from the rigid portion 12 for causing the head 6 to properly fit a large tooth. It will be noted that the bolts or screws 20 are used for separating the parts of head 6, while bolt or screw 19 is used for drawing the parts together. These bolts, together with the clamping bolt 16, hold the movable portion firmly in any of its adjusted positions.

In practical operation either a shaper formed with a solid head as disclosed in Figs. 1 to 4 may be used, or a shaper formed with an adjustable head. The adjustable head 6 disclosed in Figs. 5 and 6 may be used on various sized teeth within certain limits with the same advantage as is disclosed or provided for in the solid head.

What we claim is:

1. In a saw tooth shaper, a plate, means carried by the plate for adjustably disposing the plate upon one side of and relative to a saw, a head member carried by the plate and adapted to be positioned at the point of the tooth of the saw and provided with a depression proportioned to receive such tooth extremity, the sides of said head being tapered from opposite directions to form a guide for dressing the sides of the saw tooth.

2. A saw tooth shaper comprising a plate adapted to be spaced away from a saw and located in a plane parallel thereto, with means for adjusting the interval between the plate and the saw, a head carried by the plate comprising a notch positioned to receive the point of a saw tooth, said head being also provided upon opposite sides with tapered guides converging toward the side provided with the notch and serving as guides for an implement employed is dressing the sides of the tooth.

3. A saw tooth shaper comprising a plate, means to position the plate relative to the side of a saw, a head carried by the plate, a depression formed in the head adapted to receive the point of a saw tooth, said head being laterally expansible and provided upon opposite sides with guide surfaces converging toward the depression and adapted to serve as guides for the implement employed in dressing the sides of the tooth.

In testimony whereof I affix my signature in presence of two witnesses.

EDWIN J. LUKEMEYER.

Witnesses:
S. E. ENGELS,
M. M. KNOWLTON.

In testimony whereof I affix my signature in presence of two witnesses.

WILLIAM GEIB.

Witnesses:
M. C. GWIN,
BERNICE FLOWER.

---

Copies of this patent may be obtained for five cents each, by addressing the "Commissioner of Patents, Washington, D. C."